H. SEASTROM.
VEHICLE WHEEL.
APPLICATION FILED SEPT. 20, 1917.

1,306,192.

Patented June 10, 1919.

Inventor
Hugo Seastrom
By Thurston & Kwis
Attys.

UNITED STATES PATENT OFFICE.

HUGO SEASTROM, OF CLEVELAND, OHIO.

VEHICLE-WHEEL.

1,306,192.   Specification of Letters Patent.   Patented June 10, 1919.

Application filed September 20, 1917. Serial No. 192,235.

*To all whom it may concern:*

Be it known that I, HUGO SEASTROM, a citizen of the United States, residing at Cleveland, in the county of Cuyahoga and State of Ohio, have invented a certain new and useful Improvement in Vehicle-Wheels, of which the following is a full, clear, and exact description.

This invention relates to vehicle wheels, and has for its object to provide an efficient wheel construction by which the hub which is normally centrally located with respect to the rim may yield relative to the rim when the wheel strikes an obstruction or drops into a depression so as to absorb the major portion of the shock which would otherwise be transmitted to the body of the vehicle, and, to accomplish this with rigid spokes extending between the hub and the rim instead of yieldable springs which have been employed or proposed for use in the major portion of the so-called spring wheels of which I am aware.

Additionally the invention aims to provide means whereby when driving stress or torque is applied to the driving axle, the hub may yield circumferentially slightly so as to avoid entirely, or minimize the transmission of a jerk to the vehicle body.

These and other objects are accomplished by my invention which contemplates a wheel having a rim and a hub with spokes extending between the two, pivoted at their inner ends to the hub, and free to move circumferentially through a limited distance in the rim, together with springs which normally hold the spokes in predetermined position with respect to the hub and rim.

The invention may be further briefly summarized as consisting in certain novel details of construction and combinations and arrangements of parts which will be described in the specification and set forth in the appended claims.

Figure 1:
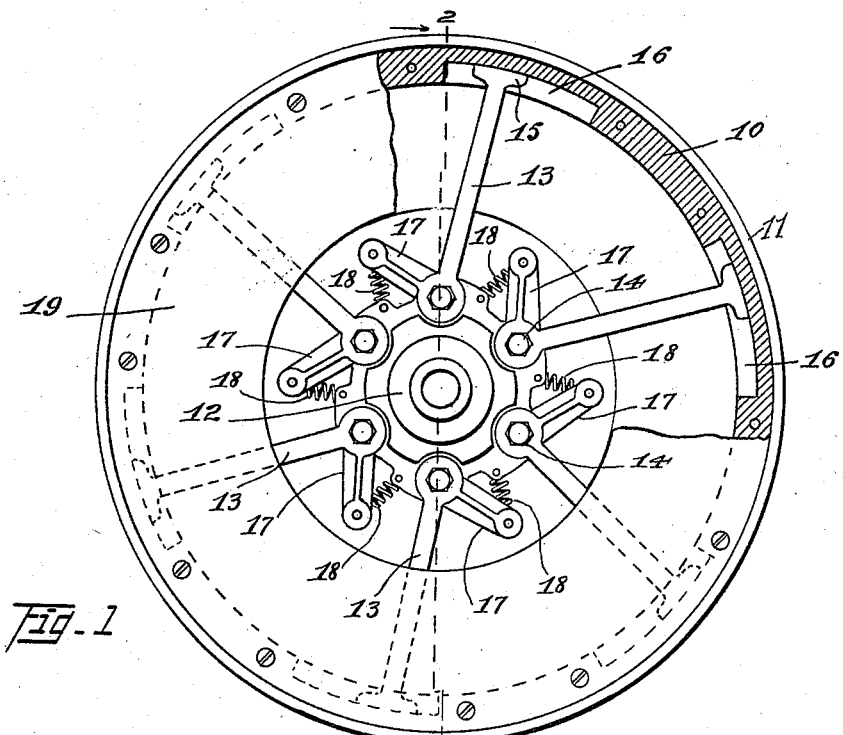
Figure 2:
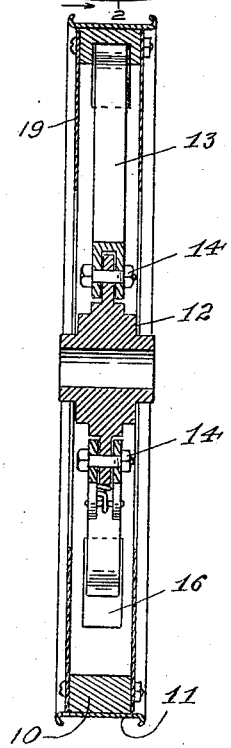

In the accompanying sheet of drawings, Figure 1 is a side elevation of a vehicle wheel embodying my invention, parts being broken away; and Fig. 2 is a sectional view substantially along the line 2—2 of Fig. 1, looking in the direction indicated by the arrows.

Referring now to the drawings, 10 represents an annular rim having at its outer periphery any suitable means 11 to receive and hold a tire which may be, and preferably is a rubber cushion tire. Normally centrally located with respect to the rim is a hub 12, and extending between the rim 10 and hub 12 are rigid spokes 13. These spokes are not fixed at their inner and outer ends as is the case with vehicle wheels of ordinary construction, but at their inner ends they are pivoted to the hub in this case by transverse bolts 14, and at their outer ends they are provided with shoes 15 which are capable of moving back and forth circumferentially of the rim in arc-shaped slots or grooves 16 of predetermined length which fix or limit this relative movement.

Yieldable means are provided to hold the spokes in predetermined position under normal conditions, this yieldable means preferably consisting of springs. In the embodiment of my invention here shown, this is accomplished by providing at the inner ends of the spokes, outstanding arms 17, and coil springs 18 which connect the ends of these arms to the hubs, the arms 17 and spokes 13 therefore being in the nature of bell-cranks.

Additionally the spokes 13 differ from the spokes of ordinary wheel constructions in the respect that they are not radial, but, normally, each is at a definite angle with respect to a radial line passing from the center of the hub outwardly through the inner end of each spoke.

Ordinarily the springs are all under equal tension and the spokes all are similarly disposed in their angular relationship with respect to the hub and rim. These conditions prevail when the wheel is in use and is traveling over a fairly smooth road. When, however, an obstruction is met, or the wheel drops into a depression so that a shock or unusual load is suddenly thrust on the wheel, the hub yields in a downward direction, and that this may take place, all the spokes at their outer ends turn slightly circumferentially, those at the bottom moving so as to increase their angularity with respect to the radial lines previously referred to, and those at the top straightening up, so to speak. But after the obstruction is passed, the hub again becomes central, the spokes moving back to their normal positions, and the springs again all assuming the same or equal tension. Similarly when driving torque is suddenly applied to the axle, the hub will turn slightly relative to the rim, the spokes then all similarly changing their angularity with respect to the radial line previously referred to, and the springs all assuming greater tension, and immediately thereafter the hub and spokes return to normal position.

The details of this wheel may be varied considerably from the details here shown, especially in the manner of forming the pivotal connections between the inner ends of the spokes and the hub and in the manner forming slots or ways in which the shoes at the outer ends of the spokes may slide. Additionally I may provide shields such as shown at 19 at the rim, which shields may extend inwardly toward the hub, somewhat as shown in the drawings, or to a greater or less extent than shown. Furthermore, the hub may have outstanding plates which overlap the plates 19 so as to conceal and protect all internal parts.

I therefore do not desire to be confined to the exact details shown, but aim in my claims to cover all modifications which do not involve a departure from the spirit and scope of my invention.

Having described my invention, what I claim is:

1. In a vehicle wheel, a rim having a slotted inner periphery, a hub, spokes extending between the hub and rim, each of the spokes being pivoted at its inner end to the hub to swing about an axis substantially parallel to the axis of the hub and at its outer end having sliding contact with the slotted portion of the rim, said spokes being normally substantially radially disposed, and springs yieldingly resisting swinging movement of said spokes in a direction away from radial position.

2. In a vehicle wheel, a rim having a grooved inner periphery, a hub, spokes extending between the hub and rim and normally substantially radially disposed but at slight angles with radial lines passing through the inner ends of the spokes, said spokes being each pivoted to the hub to swing about an axis substantially parallel to the axis of the hub and having at its outer end a shoe slidably engaging the grooved portion of the rim, and springs yieldingly resisting the swinging movement in a direction away from radial position.

3. In a vehicle wheel, a hub, a rim, and spokes extending between the rim and hub, the rim having a grooved inner periphery and the spokes being pivoted at their inner ends to the hub to swing about axes substantially parallel to the axis of the hub and at their outer ends having sliding contact with the grooved portion of the rim and adapted to swing circumferentially thereof said spokes being normally substantially radially disposed but at slight angles with radial lines passing through the inner ends of the spokes, and springs connecting the spokes to the hub, and yieldingly resisting movement away from radial position.

In testimony whereof, I hereunto affix my signature.

HUGO SEASTROM.

Copies of this patent may be obtained for five cents each, by addressing the "Commissioner of Patents, Washington, D. C."